United States Patent [19]

Cavestri et al.

[11] Patent Number: 5,979,226
[45] Date of Patent: Nov. 9, 1999

[54] LEAK DETECTION ADDITIVES FOR OIL OR FUEL SYSTEMS

[75] Inventors: Richard C. Cavestri, Columbus, Ohio; Terrence D. Kalley, Troy, Mich.

[73] Assignee: Bright Solutions, Inc., Troy, Mich.

[21] Appl. No.: 09/136,672

[22] Filed: Aug. 19, 1998

Related U.S. Application Data

[63] Continuation-in-part of application No. 09/065,007, Apr. 23, 1998, and a continuation of application No. 09/019,340, Feb. 5, 1998.

[51] Int. Cl.$^6$ .................................................. G01M 3/20
[52] U.S. Cl. ........................ 73/40.7; 252/301.16; 252/964
[58] Field of Search .................... 73/40.7; 62/77, 62/125; 252/68, 301.16, 964

[56] References Cited

U.S. PATENT DOCUMENTS

| | | |
|---|---|---|
| 2,918,033 | 12/1959 | Snyder . |
| 2,918,893 | 12/1959 | Norton . |
| 3,027,754 | 4/1962 | Alquist et al. ............................ 73/40.7 |
| 3,476,500 | 11/1969 | Litke ........................................... 8/524 |
| 3,483,735 | 12/1969 | Packo ...................................... 73/40.7 |
| 3,483,736 | 12/1969 | Anderson et al. ....................... 73/40.7 |
| 3,523,771 | 8/1970 | Anderson ................................ 73/40.7 |
| 3,572,085 | 3/1971 | Packo . |
| 3,856,465 | 12/1974 | Lipscomb ................................ 73/104 |
| 4,288,402 | 9/1981 | Ellis . |
| 4,348,235 | 9/1982 | Lasswell et al. . |
| 4,382,679 | 5/1983 | Lee . |
| 4,436,641 | 3/1984 | Stelz et al. . |
| 4,615,828 | 10/1986 | Wegrzyn . |
| 4,662,940 | 5/1987 | Monier . |
| 4,693,118 | 9/1987 | Roberts ................................... 73/40.7 |
| 4,745,797 | 5/1988 | Wegrzyn ................................. 73/40.7 |
| 4,756,854 | 7/1988 | Wegrzyn . |
| 4,758,366 | 7/1988 | Parekh ...................................... 252/68 |
| 4,784,959 | 11/1988 | Wegrzyn . |
| 4,822,743 | 4/1989 | Wegrzyn . |
| 4,897,551 | 1/1990 | Gersh . |
| 4,938,063 | 7/1990 | Leighley ................................. 73/40.7 |
| 5,149,453 | 9/1992 | Parekh ...................................... 252/68 |
| 5,167,140 | 12/1992 | Cooper et al. .......................... 73/40.7 |
| 5,167,867 | 12/1992 | Quaife . |
| 5,279,967 | 1/1994 | Bode . |
| 5,357,782 | 10/1994 | Henry ..................................... 73/40.7 |
| 5,558,808 | 9/1996 | Smith . |
| 5,650,563 | 7/1997 | Cooper et al. .......................... 73/40.7 |

FOREIGN PATENT DOCUMENTS

| | | | |
|---|---|---|---|
| 63-204126 | 8/1988 | Japan ..................................... 73/40.7 |
| 4-242134 | 8/1992 | Japan ..................................... 73/40.7 |
| 1181426 | 2/1970 | United Kingdom .................... 73/40.7 |

*Primary Examiner*—Daniel S. Larkin
*Attorney, Agent, or Firm*—Fish & Richardson P.C.

[57] ABSTRACT

A dye-delivery composition for introducing a leak detection dye into an engine oil or fuel system is described. The dye-delivery composition is a mixture of a lubricant and a leak detection dye. The dye-delivery composition can be thixotropic, a paste, a suspension, or a unitary structure. The dye-delivery composition can be inserted into appropriate locations within the engine oil or fuel system.

24 Claims, No Drawings

LEAK DETECTION ADDITIVES FOR OIL OR FUEL SYSTEMS

CROSS-REFERENCE TO RELATED APPLICATIONS

This is a continuation-in-part of copending U.S. Ser. No. 09/065,007, filed Apr. 23, 1998 and a continuation-in-part of U.S. Ser. No. 09/019,340, filed Feb. 5, 1998, each of which is incorporated herein by reference.

BACKGROUND OF THE INVENTION

The invention relates to a dye-delivery composition for introducing a leak detection dye into an engine oil or fuel system.

Leak detection methods have been developed to analyze fluid systems, such as climate control systems such as heating, cooling, ventilating, and air conditioning systems, hydraulics, engine oil systems, automatic transmission systems, fuel systems, brake systems, or radiator coolant systems, using dyes. Some methods employ emissive substances, such as, for example, fluorescent or phosphorescent dyes that are added in liquid solutions to systems.

Leaks can be detected by observing fluorescence of the dye at leak sites resulting from excitation of the dye with a light source having particular illumination characteristics, such as illumination wavelength or intensity. Suitable light sources for use in fluorescence detection emit light of wavelengths that excite the dye and cause light emission from the dye, which is at a greater wavelength than excitation wavelength. In general, the dyes fluoresce brightly when excited by light in the 190 to 700 nanometer wavelength range.

SUMMARY OF THE INVENTION

In general, the invention features a dye-delivery composition for introducing a leak detection dye into an engine oil or fuel system. The dye-delivery composition can be inserted directly into an assembled system or a system component during assembly of the system or during service. The dye-delivery composition has a high weight percentage of dye, which can reduce the total amount of material that is introduced into the system to detect leaks.

In one aspect, the invention features a dye-delivery composition including a leak detection dye and an additive that is compatible with an engine oil or fuel system. The leak detection dye present in the composition includes a plurality of dye particles. The additive includes stearic acid, a wax, an engine oil, a lubricating oil compatible with an engine or fuel system, a hydrocarbon, a synthetic oil, or a polyolester. The dye-delivery composition includes at least 5 weight percent of the dye. The dye can be a naphthalimide. The composition can be a concentrate, a paste, or a suspension.

In another aspect, the invention features a method of manufacturing a dye-delivery composition. The method includes the steps of combining a leak detection dye and an additive that is compatible with an engine oil or fuel system to form a mixture, and mixing the mixture to form a dye-delivery composition. The mixing can be by high shear mixing, roller mixing, or milling. The dye can be a micronized powder.

The dye-delivery composition can have a viscosity of at least 10 cps, preferably at least 500 cps, more preferably at least 3,000 cps, even more preferably at least 10,000 cps, even more preferably at least 100,000 cps, and most preferably at least 500,000 cps. The dye-delivery composition can have a viscosity of between about 1 million cps and 4 million cps. Generally, a Brookfield RVT viscometer can be used for this measurement under conditions in which the dye-delivery composition exhibits fluid-like behavior.

The leak detection dye includes a plurality of dye particles. The plurality of particles can be suspended in the additive. The plurality of particles has a distribution of particle sizes. Greater than 60 percent of the particles can have a particle size of less than 40 microns. Preferably, greater than 80 percent of the particles have a particle size of less than 40 microns. Greater than 10 percent of the particles have a particle size of less than 5 microns. Preferably, greater than 40 percent of the particles have a particle size of less than 5 microns. More preferably, greater than 50 percent (e.g., greater than 60 percent) of the particles have a particle size of less than 5 microns. In preferred embodiments, greater than 80 percent of the particles have a particle size of less than 5 microns. In other embodiments, greater than 5 percent of the particles have a particle size of less than 10 microns, or greater than 20 percent of the particles have a particle size of less than 20 microns.

Preferably, the concentrate includes at least 10 weight percent of the leak detection dye, more preferably at least 25 weight percent of the leak detection dye, and even more preferably at least 40 weight percent of the leak detection dye. In preferred embodiments, the dye-delivery composition includes at least 50 weight percent of the leak detection dye. The dye-delivery composition can include at least 60 weight percent or at least 70 weight percent of the leak detection dye.

In another aspect, the invention features a method of introducing a leak detection dye in a an engine oil or fuel system. The method can include placing a dye-delivery composition in a component of the system, for example, during manufacture or during service. Placing the dye-delivery composition in a component can include, for example, depositing the dye-delivery composition onto an inside or outside surface of the component or inserting the dye-delivery composition into the interior of the component. The method can include assembling the system after placing the composition into or onto the component. In other embodiments, the dye-delivery composition is placed in a component of an assembled system, for example, by injection.

A dye-delivery composition, including the leak detection dye and additive, can have a sufficiently high viscosity to allow it to be placed directly onto the system or a component of the system without dripping or otherwise running off of the component. For example, the composition can be thixotropic, semi-solid, or solid. A semi-solid composition is a deformable composition, such as a paste or gel.

Introducing a leak detection dye as a dye-delivery composition during the assembly of the system can enable the system to be tested for leaks to provide a quality assurance tool prior to shipment of the system. It can also facilitate checking the system for leaks at a later time in the field without charging the system with additional leak detection dye. The dye-delivery composition can provide a simple way to insert dyes into, for example, an engine oil or fuel system rapidly and cleanly. Installation during assembly also allows manufacturers to test products on site, permitting the rapid identification of leaks.

Insertion location, composition properties, and dye properties can be selected to improve cost, ease of insertion, cleanliness of handling, capital equipment costs, material waste, environmental impact, shelf life prior to insertion in the system, and chemical life once introduced into the system. The concentrate can be substantially compatible with known systems because the composition can include only the additive and the leak detection dye.

The dye-delivery composition is easy to handle and use. Because the dye-delivery composition carries a high weight percentage of the dye, use of the concentrate can reduce the risk of contaminating the work environment with the dye, which can lead to erroneous leak detection. In addition, the concentrate dissolves completely in the oil or fuel. The dye-delivery composition can be essentially solvent-free and can be substantially free of impurities that could otherwise damage a system. Small amounts of other additives such as surfactants (e.g., siloxanes) can be included in the concentrate.

Additional features and advantages of the invention will become apparent from the detailed description of the preferred embodiments of the invention.

DESCRIPTION OF THE PREFERRED EMBODIMENTS

A dye-delivery composition includes a leak detection dye and an additive. Preferably, the dye-delivery composition can consist essentially of the leak detection dye and the additive. The composition can be characterized as a concentrate, a paste, a suspension, or a solid structure. The leak detection dye can include a naphthalimide, a perylene, a coumarin, a thioxanthane, or a derivative thereof, or other dye compatible with an engine oil or fuel system. The composition can contain a high proportion (e.g., greater than 50%) of leak detection dye.

Suitable additives and dyes are soluble in the engine oil or the fuel of the system. Since typical engine oil and fuel systems are anhydrous, the preferred additive is an organic compound. The additive is compatible with the components of the engine oil or fuel system and does not react adversely with the engine oil or fuel, such as gasoline, propane, diesel fuel, other hydrocarbons, ethanol, hydroxylated fuels, natural gas, or esters, over a wide range of temperature and pressure conditions encountered in use. The solubility and compatibility of the additive with the components of the engine oil or fuel system can lead to rapid dissolution properties of the structure. The additive can be a lubricant, in the case of a concentrate, a paste, or a suspension, or a binding agent, in the case of a solid structure.

Several techniques are available for preparing the dye-delivery composition. Generally, particles of the leak detection dye are combined with the additive to form a mixture. The mixture can be processed to form a concentrate, a paste, a suspension, or a solid structure.

A lubricant can include an engine oil, a lubricating oil compatible with an engine or fuel system, a synthetic oil, a polyalkylene glycol, a polyolester, a mineral oil, a polyvinyl ether, an alkylbenzene, or another synthetic lubricating material. The engine oil can be 05, 10W40, 15W50, 5W30, or any other engine oil. Suitable polyalkylene glycol or polyol ester lubricants include, for example, Emery 2927a, Mobil Arctic EAL 68, Union Carbide UCON 488 Refrigeration Lubricant, Union Carbide UCON MLX-1197 Experimental Lubricant, Union Carbide 50-HB5100, Motorcraft YN-12B, Ford PAG, Chrysler PAG, or any other automotive PAG. UCON 488 is a polyalkylene glycol having a viscosity of about 133 centistokes at 40° C. Union Carbide 50-HB5100 is a polyalkylene glycol having a viscosity of about 1020 centistokes at 40° C. Motorcraft YN-12B is a polyalkylene glycol having a viscosity of about 56 centistokes at 40° C. The viscosity of the lubricant can affect the viscosity of the dye-delivery composition.

The binding agent can include a wax, a fatty acid, a fatty alcohol, a fatty acid ester, a resin composition, a polyol ester, a polyalkylene glycol, or a hydrocarbon, or mixtures thereof. The resin composition can include beeswax, carnauba wax, an automotive polishing wax, floor polish, or a polyethylene glycol. The wax can be a paraffinic wax, a naphthenic wax, a synthetic wax (e.g., paraffinic raffinate), a stearic wax, a natural wax, or any other wax-like material that is compatible with engine oil or fuel. The polyol ester can be a pentaerythritol ester, a trimethanol propane ester, a triglyceride, diglyceride, or a complex polyol ester. The fatty acid, fatty alcohol, fatty acid ester, and polyol esters such as triglycerides and diglycerides have saturated or unsaturated $C_4$–$C_{18}$ chains. The esters can be $C_1$–$C_{18}$ alkyl esters. In particular, the binding agent can include stearic acid, methyl stearate, coconut oil, tricaprin, hydrenol, Lorol(C16), Lorol (C118), cocoa butter, methyl laurate, methyl myristate, coconut fatty acid, methyl coconate, lauryl alcohol, cetyl alcohol, peanut oil, hydrogenated coconut oil, and hydrogenated peanut oil. Tricaprin is a $C_{12}$ compound. Preferred binding agents include stearic acid, methyl stearate, coconut oil, and coconut fatty acid. A variety of binding agents are available, for example, from Aldrich Chemical Co., Abitec Corporation, Henkel, Universal Preserve-A-Chem. Suitable lubricants include system lubricants, such as polyalkylene glycol or polyol ester lubricants. The solid structure can contain between 0 and 10 weight percent binding agent, preferably between about 0.1 and about 5 weight percent, and more preferably between 2 and 4 weight percent.

In general, solid structures can be formed by thorough mixing via grinding, milling, or other granulation methods which provide mixtures that can be molded or compacted into the solid structures. After mixing, the mixture is formed into the dye-delivery structure by extrusion, compaction, molding, heating, or cooling. The mixture can be compacted by supplying pressure using mechanical press or manual means. The resulting structure can take the form of a tablet, a briquette, a sphere, a disc, a bead, a pellet, or a cylinder. The dye-delivery structure can be formed with maximum surface area to assist in dissolution by providing enhanced or embossed surfaces or structures with one or more holes or openings therethrough.

The solid structure is compacted to a degree sufficient to avoid damage during normal handling and storage and at the same time being of a density sufficient to facilitate dissolution when placed into the system to aid in the detection of leaks. The solid structures have good mechanical strength, for example, to impact and vibration, are not too brittle, and are capable of rapid dissolution. In general, harder structures have slower dissolution rates. In other words, the pressure applied to form the structure by compaction is selected to increase hardness of the structure, while maintaining good dissolution rates and solubility for the structure.

Hardness of the structure can be determined using Tablet Hardness Tester, Model 900-539-001, available from DT Industries, Stokes Division, Bristol, Pa. The hardness of the structure can be between 2 and 25 kg, preferably between 3 and 15 kg using this test. The hardness of tablets including a naphthalimide leak detection dye, 2–4% of a binding agent, and 0–2% of a lubricant varied between 3.5 kg and 9.5 kg.

Solubility rate of the structure can be determined by a percent solubility test. First, the structure is weighed and placed into a test tube with a known volume of a liquid component of the engine oil or fuel system. The tube is then placed onto an oscillating test tube rack and rotated for 2 hours. After two hours, the structure is removed from the oscillating rack and allowed to air dry. The structure was reweighed and the percent solubility was calculated according to the formula:

% solubility=(initial weight−final weight)/initial weight

The percent solubility of the structure, according to the test method, can be greater than 50 percent, preferably greater than 60 percent, more preferably greater than 75 percent, and most preferably greater than 85 percent. The percent solubility of tablets including a naphthalimide leak detection dye, 2–4% of a binding agent, and 0–2% of a lubricant varied between 49 percent and 89 percent, according to the above-described test method.

In general, the concentrate, suspension, or paste can be formed from particles suspended or dispersed in the additive by mechanical means. The process involves steps that thoroughly mix the two components of the concentrate while decreasing the particle size of the dye. For example, the mixture can be subjected to high shear mixing conditions in an impeller mill or blender such as an emulsifier or a homogenizer. Other mills that can be used to disperse the solid dye particles in the additive include ball mills, stirred media mills, vibratory mills, multiple roll mills (e.g., a three roll mill or a five roll mill), or ultrasonic mills.

The mechanical mills can reduce the particle sizes of the dye during the mixing process. The smaller particle sizes can lead to more stable suspensions. The smaller particles can be re-dispersed readily in the additive by agitation.

The particle size distribution of the dye powder can be reduced prior to mixing the dye with the additive. The particle size reduction can be achieved using, for example, a crusher, pulverizer, grinding mill, attrition mill, ball mill, sand mill, bead mill, chaser mill, jar mill, hammer mill, impact grinding mill, air jet mill, or micronizer.

Dye powders can be processed by methods described in "Remington's Pharmaceutical Sciences," 14th Edition, Mack Publishing Co., 1970, which is incorporated herein by reference. Particular mixing conditions are described, for example, in U.S. Ser. No. 09/065,007, filed Apr. 23, 1998 and U.S. Ser. No. 09/019,340, filed Feb. 5, 1998, each of which is incorporated herein by reference.

The dye-delivery composition can be placed into an engine oil or fuel system. The dye-delivery composition need not be immobilized in the system. Suitable locations can provide a desired dissolution rate of the dye-delivery composition. In particular, the composition can be placed on the inside or outside of a component of an engine oil or fuel system. The concentrate, suspension, or paste can be dispensed into the system by, for example, a syringe or other metering device. The solid structure can be added as a unit into the system. The concentrate, paste, or suspension can have a thickness or viscosity sufficient to prevent dripping of the dye from the component after it is dispensed.

In an engine oil or fuel system the dye-delivery composition can be placed in a component of the system. The component can be an oil filter, an engine block, an oil pan, a fuel tank, or a fuel filter. The composition can be placed into the component before assembly of the system, or after assembly of the system. For example, the composition can be placed in an oil filter that is added to an existing engine system, such as when a system is being serviced. Alternatively, the composition can be added to a component of the engine oil system at the point of manufacture or remanufacture. For example, a composition can be introduced into an oil filter or onto the bottom of oil filter for instant dye circulation. The composition can also be injected into the oil pan or into the top part of the engine.

After placing the composition into a system, it is operated. During operation, the oil or fuel dissolves the leak detection dye, dispersing it throughout the system. Once dissolved, the dye content of the system can be below about 1.0, preferably less than 0.5 percent, and more preferably less than 0.1 percent. After the dye has been allowed to dissolve within the system, system components, joints, fittings, or attachments can be examined for leaks with a light source having a light emission wavelength from 190 nanometers to 700 nanometers. The presence of a leak can be determined by the presence of a colored visual indication, such as fluorescence or other emission, that can be detected optically (e.g., visually) after excitation with the light from the light source.

The following examples are illustrative, but not limitive, of the invention.

EXAMPLES

A number of compositions were prepared by mixing powdered leak detection dye with an additive lubricant.

Solvent Yellow 43 dye powder (CAS 19125-99-6) was micronized using an air jet mill. The resulting micronized dye powder had a particle size distribution in which all of the particle sizes were less than 11 microns, with an average particle size of 2.17 microns. The micronized dye powder was combined with a 10W40 engine oil at dye concentrations of 30 weight percent, 60 weight percent, and 70 weight percent. The materials were weighed and placed on a flat stainless steel surface. The engine oil was added and the materials were milled by hand using a spatula against the flat surface. With time, more oil was gradually added. Each batch was approximately 1 pound in size and took about 30 to 45 minutes to mill by hand. Examples of compositions prepared using the micronized dye powder are shown in Table I.

TABLE I

| Example | Additive Type | Wt % Additive | Wt % Dye | Type |
|---|---|---|---|---|
| 1 | 10W40 engine oil | 70 | 30 | Thick flowable liquid |
| 2 | 10W40 engine oil | 40 | 60 | Thick paste |
| 3 | 10W40 engine oil | 30 | 70 | Thick paste |

The dye-delivery composition had a high enough concentration of dye to yield sufficient fluorescence when excited with a UV lamp to permit satisfactory leak detection when about one quarter ounce of Example 1 was placed into about 4 quarts of engine oil. The light yellow color and strong green fluorescence of the naphthalimide dye allows for more rapid and effective leak detection.

The composition of Example 1 exhibits good stability when placed into an engine oil system of a vehicle. The composition was added to the system by introducing the composition of Example 1 through the oil filler cap of the engine. The engine was run for about five minutes to disperse the dye in the oil. The engine of the vehicle was run for a test period of about 40 hours. After running for the test period, the dipstick was removed and a strong fluorescence of the oil on the dipstick was observed.

Other embodiments are within the claims. For example, the composition can include small amounts of a silicone or a phosphate ester. In another example, the dye-delivery composition can be adsorbed onto a substrate material. The compositions can be used to introduce leak detection dyes into an automatic transmission system, a hydraulic system, a machine lubricating system, a brake system, or a radiator coolant system.

What is claimed is:

1. A dye-delivery composition comprising:

a leak detection dye including a plurality of dye particles; and an additive compatible with an engine oil or fuel system, wherein the dye-delivery composition is a concentrate, a paste, a liquid suspension, or a solid structure and includes at least 5 weight percent of the dye and greater than 80 percent of the dye particles have a particle size of less than 40 microns.

2. The dye-delivery composition of claim 1, wherein the additive is selected from a group consisting of stearic acid, a wax, an engine oil, a lubricating oil compatible with an engine or fuel system, a hydrocarbon, a synthetic oil, and a polyolester.

3. The dye-delivery composition of claim 1, wherein the dye-delivery composition includes at least 40 weight percent of the leak detection dye.

4. The dye-delivery composition of claim 1, wherein the dye-delivery composition includes at least 50 weight percent of the leak detection dye.

5. The dye-delivery composition of claim 1, wherein the dye-delivery composition includes at least 70 weight percent of the leak detection dye.

6. The dye-delivery composition of claim 1, wherein the leak detection dye comprises a naphthalimide.

7. The dye-delivery composition of claim 1, wherein the dye-delivery composition is thixotropic.

8. A method of manufacturing a dye-delivery composition comprising:

combining a leak detection dye including a plurality of dye particles and an additive compatible with an engine oil or fuel system to form a mixture, wherein greater than 80 percent of the dye particles have a particle size of less than 40 microns; and mixing the mixture to form a dye-delivery composition, wherein the dye-delivery composition is concentrate, a paste, a liquid suspensions or a solid structure.

9. The method of claim 8, wherein mixing comprises high shear mixing.

10. The method of claim 8, wherein the additive is selected from a group consisting of stearic acid, a wax, an engine oil, a lubricating oil compatible with an engine or fuel system, a hydrocarbon, a synthetic oil, and a polyolester.

11. A method of introducing a leak detection dye in an engine oil or fuel system comprising:

placing a concentrate, a paste, a liquid suspension or a solid structure dye-delivery composition in a component of an engine oil or fuel system, the dye-delivery composition comprising a leak detection dye including a plurality of dye particles, wherein greater than 80 percent of the dye particles have a particle size of less than 40 microns, and an additive compatible with the engine oil or fuel system, the dye-delivery composition including at least 5 weight percent of the dye.

12. The method of claim 11, wherein the component is an oil filter, an engine block, an oil pan, a fuel tank, or a fuel filter.

13. The method of claim 11, wherein the leak detection dye comprises a naphthalimide.

14. The method of claim 11, further comprising assembling the engine oil or fuel system after placing the dye-delivery composition into the component.

15. The method of claim 11, wherein the system is assembled and includes the component prior to placing the dye-delivery composition into the component.

16. The method of claim 11, wherein the dye-delivery composition includes at least 40 weight percent of the leak detection dye.

17. The method of claim 11, wherein the dye-delivery composition includes at least 50 weight percent of the leak detection dye.

18. The dye-delivery composition of claim 11, wherein the dye-delivery composition includes at least 70 weight percent of the leak detection dye.

19. A dye-delivery composition comprising:

a leak detection dye including a plurality of dye particles and a wax, wherein the wax is compatible with an engine oil or fuel system and the dye-delivery composition includes at least 5 weight percent of the dye.

20. The dye-delivery composition of claim 19, wherein the dye-delivery composition includes at least 40 weight percent of the leak detection dye.

21. The dye-delivery composition of claim 19, wherein the leak detection dye comprises a naphthalimide.

22. The dye-delivery composition of claim 19, wherein greater than 80 percent of the particle, have a particle size of less than 40 microns.

23. The dye-delivery composition of claim 19, wherein the dye-delivery composition is a solid structure.

24. The dye-delivery composition of claim 19, wherein the dye-delivery composition is a concentrate, a paste, or a suspension.

* * * * *